United States Patent [19]
Chang et al.

[11] Patent Number: 5,734,737
[45] Date of Patent: Mar. 31, 1998

[54] METHOD FOR SEGMENTING AND ESTIMATING A MOVING OBJECT MOTION USING A HIERARCHY OF MOTION MODELS

[75] Inventors: Gyu-Hwan Chang; Hae-Mook Jung, both of Seoul; Seong-Dae Kim, Daejeon; Jae-Gark Choi, Daejeon; Si-Woong Lee, Daejeon; Soon-Jae Cho, Daejeon, all of Rep. of Korea

[73] Assignee: Daewoo Electronics Co., Ltd., Seoul, Rep. of Korea

[21] Appl. No.: 502,228

[22] Filed: Jul. 13, 1995

[51] Int. Cl.⁶ .................................. G06T 9/00
[52] U.S. Cl. .................. 382/107; 382/173; 382/236; 348/416
[58] Field of Search ................. 382/236, 107, 382/173; 348/402, 407, 413, 416

[56] References Cited

PUBLICATIONS

Adiv, "Determination Three-Dimensional Motion and Structure from Optical Flow Generated by Several Moving Objects," IEEE Transactions on Pattern Analysis and Machine Intelligence, vol. PAMI-7, No. 4, Jul. 1985, pp. 384–401.

Jaswant R. Jain, et al., "Displacement Measurement and Its Application in Interframe Image Coding", IEEE Transactions on Comm., 1981, vol. com–29,#12.

Hötter et al. "Image Segmentation Based on Object Oriented Mapping Parameter Estimation." Signal Processing, vol. 15, pp. 315–334, 1988.

Goh et al. "A Multiresolution Model-Based Segmentation Algorithm for 3–D Motion and Structure Estimation." Proceedings of 1994 IEEE Region 10's 9th Annual Int. Conf., vol. 2, pp. 862–866, Aug. 1994.

Nicolas et al.,"Region–Based Motion Estimation Using Deterministic Relaxation Schemes for Image Sequence Coding," ICASSP-92, vol. 3, pp. 265–268, Mar. 1992.

Choi et al. "Segmentation and Motion Estimation of Moving Objects for Object–Oriented Analysis–Synthesis Coding," 1995 Int. Conf. on Acoustics, Speech, Sig. Proc., vol. 4, pp. 2431–2434, May 1995.

Primary Examiner—Michael T. Razavi
Assistant Examiner—Jon Chang
Attorney, Agent, or Firm—Anderson, Kill & Olick, P.C.

[57] ABSTRACT

A method, for use in an object-oriented analysis-synthesis coder, for segmenting an image signal into moving objects contained in a current frame and describing each motion of the moving objects with a set of motion parameters using a multi-stage segmentation comprises the steps of: (a) comparing the current frame with its preceding frame to detect a moving area in the current frame; (b) further comparing the current frame with the preceding frame to detect a motion vector for each pixel in the moving area, i.e., a motion vector field; (c) first segmenting the motion vector field by using a two dimensional translational patch model; (d) secondly segmenting the first stage segmenting results by using a planar patch model; and (e) thirdly segmenting the second-stage segmenting results by using a parabolic patch model.

2 Claims, 6 Drawing Sheets

METHOD FOR SEGMENTING AND ESTIMATING A MOVING OBJECT MOTION USING A HIERARCHY OF MOTION MODELS

FIELD OF THE INVENTION

The present invention relates to an objected-oriented analysis-synthesis coding technique for encoding image signals; and, more particularly, to a method for segmenting an image according to the moving objects therein and estimating each motion of the moving objects.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of a data compression technique, especially in the case of such low bit-rate video signal encoder as video-telephone or teleconference system.

One of such methods for encoding video signals for a low bit-rate encoding system is the so-called object-oriented analysis-synthesis coding technique, wherein an input video image containing moving objects therein is divided according to the moving objects; and each object is described by three sets of parameters defining the motion, contour(or shape) and pixel data of the object.

In order to achieve the primary goal of the object-oriented analysis-synthesis coding technique, i.e., the task of exactly dividing the input video image into the moving objects therein and precisely estimating each motion of the moving objects, there have been proposed several approaches. One of them is a hierarchically structured segmentation technique(see Michael Hotter et al., "Image Segmentation Based on Object Oriented Mapping Parameter Estimation", *Signal Processing*, 15, No. 3, pp 315-334(October 1988)).

According to the hierarchically structured segmentation technique, an area of the input video image to be segmented is defined by a set of uniform motion and position parameters denoted as mapping parameters. For instance, eight parameters are used to describe an arbitrary three-dimensional motion of a planar rigid object. In a first step, a change detector distinguishes between temporally changed and unchanged regions of two successive fields. Each changed image region is interpreted as one object. The motion and position of each object is described by one set of mapping parameters. Based on the mapping parameters and the information on a temporally preceding field, reconstruction of a temporally ensuing field can be achieved. In a next step of hierarchy, those regions of the image, which are not correctly described in their mapping, are again detected by the change detector and treated according to the changed parts detected at the first step of hierarchy. However, in this technique, if a large number of moving objects is included within one changed area, it is rather difficult to properly segment and precisely estimate them.

SUMMARY OF THE INVENTION

It is, therefore, a primary object of the invention to provide an improved method for exactly segmenting an image signal into the moving objects therein and precisely estimating each motion of the moving objects with a set of motion parameters through the use of a multi-stage segmentation scheme.

In accordance with the invention, there is provided a method, for use in an object-oriented analysis-synthesis coder, for segmenting an image signal, said image signal containing moving objects therein, of a current frame into regions according to the moving objects therein and describing each motion of the moving objects with a set of motion parameters based on a hierarchy of motion models, which comprises the steps of:

(a) comparing the current frame with a preceding frame to detect a moving area in the current frame;

(b) further comparing the current frame with the preceding frame to detect a motion vector for each pixel in the moving area, to thereby produce a motion vector field;

(c) segmenting the motion vector field into parts referred to as translational patches, each of the translational patches having a two dimensional translational motion defined, using a set of two motion parameters, as:

$$u(x,y) = a_1$$

$$v(x,y) = a_2$$

(d) merging the translational patches into larger parts called as planar patches, each of the planar patches being represented with a planar patch model described with a set of six motion parameters as:

$$u(x,y) = a_1 + a_2 x + a_3 y$$

$$v(x,y) = b_1 + b_2 x + b_3 y$$

and (e) grouping the planar patches into still larger parts designated as parabolic patches, each of the parabolic patches being represented with a parabolic patch model described with a set of twelve motion parameters as:

$$u(x,y) = a_1 + a_2 x + a_3 y + a_4 x^2 + a_5 y^2 + a_6 xy$$

$$v(x,y) = b_1 + b_2 x + b_3 y + b_4 x^2 + b_5 y^2 + b_6 xy$$

wherein $u(x,y)$ and $v(x,y)$ are an x-directional and a y-directional components of a motion vector located at a pixel position $(x,y)$ in the motion vector field, respectively, and $a_1$ to $a_6$ and $b_1$ to $b_6$ are real numbers.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
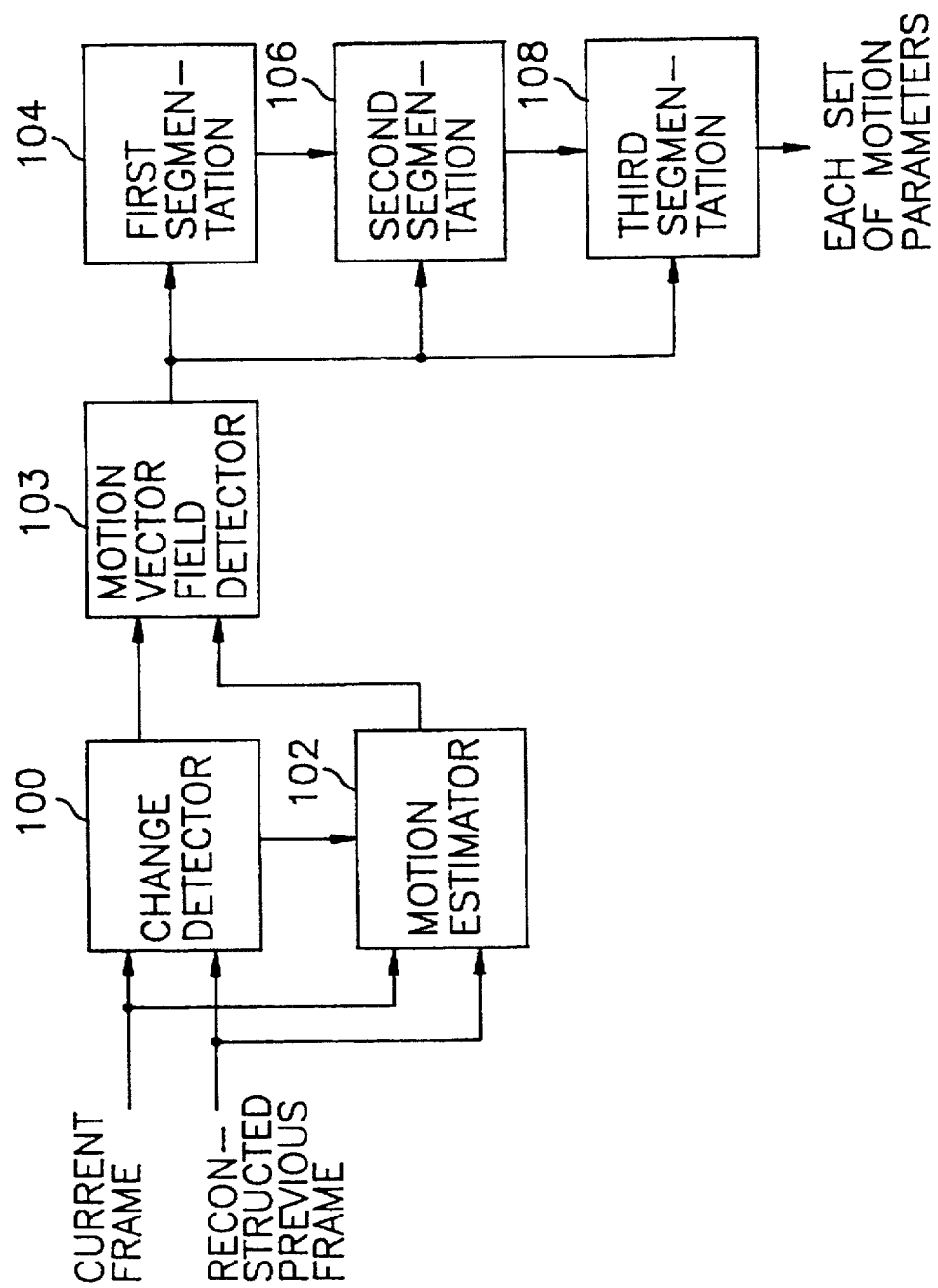
FIG. 1 is a block diagram of segmenting an image into the moving objects therein and describing each motion of the moving objects with a set of motion parameters in accordance with the present invention.

As shown in FIG. 1, two input signals, i.e., a current frame signal and a reconstructed previous frame signal are fed to a change detector 100 and a motion estimator 102, respectively.

The change detector 100 compares the current frame signal with the reconstructed previous frame signal to detect a changed area from the background in the current frame. The detected changed area information is sent to the motion estimator 102 and a motion vector field detector 103.

The motion estimator 102 detects motion vectors for a set of selected pixels, i.e., feature points, in the changed area, wherein each of the feature points is a pixel capable of representing its neighboring pixels. That is, a number of feature points are first selected from all of the pixels contained in the changed area. Then, motion vectors for each of the selected feature points are determined by forming a block of a predetermined size at each of the selected feature points and by using a block matching algorithm(see, e.g., J. R. Jain et al., "Displacement Measurement and Its Application in Interframe Image Coding", *IEEE Transactions on Communications*, COM-29, No. 12 pp 1799-1808 (December 1981)), wherein each of the motion vectors represents a spatial displacement between one feature point in the current frame and a corresponding matching point, i.e., a most similar pixel, in the reconstructed previous frame.

Figure 2:
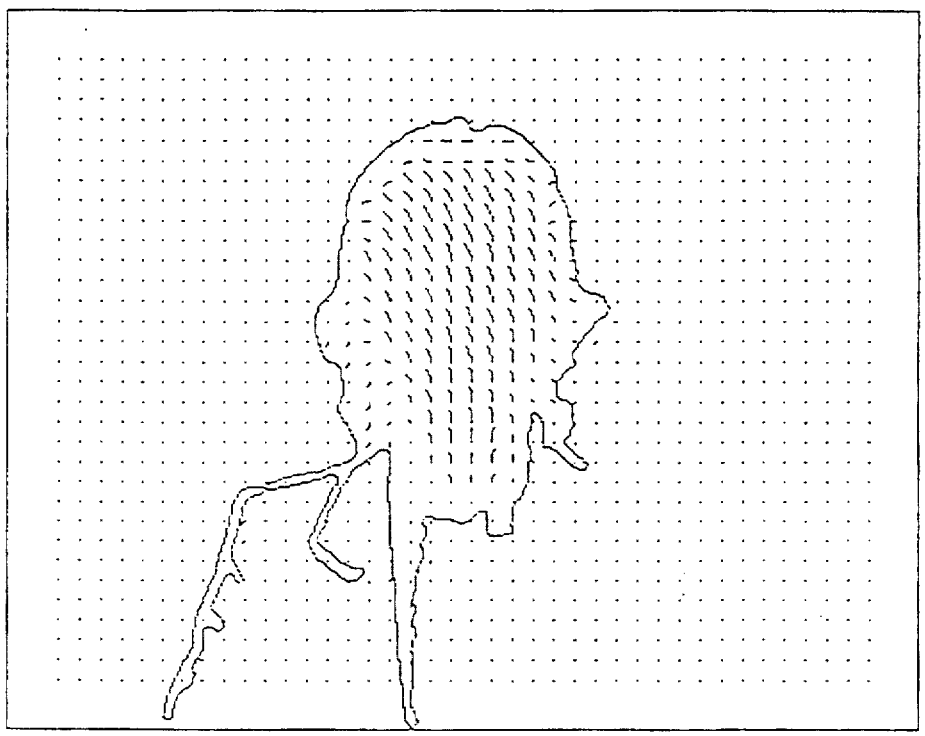
FIGS. 2 to 6 are explanatory diagrams illustrating the segmenting process of an image into the moving objects in accordance with the present invention.

The motion vector field detector 103 determines motion vectors for non-feature points in the changed area by averaging the motion vectors for the feature points, to thereby determine motion vectors for all of the pixels in the changed area. The changed area defined by the motion vectors for all of the pixels therein is called a motion vector field. As shown in FIG. 2, there is depicted an exemplary motion vector field obtained from two sequential head-and-shoulder image frames.

To segment the motion vector field into regions according to the moving objects, a multi-stage, e.g., 3-stage, segmentation scheme is employed in accordance with the present invention. The three stages are prepared at a first, a second and a third segmentation blocks 104, 106 and 108, respectively.

Figure 3:
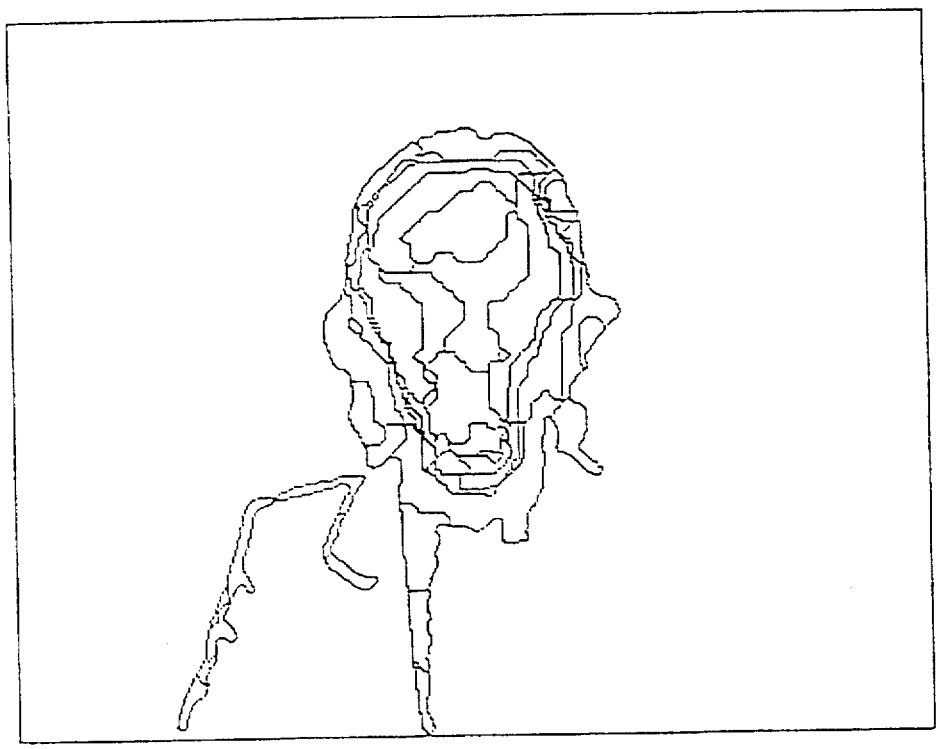

The first segmentation block 104 segments the motion vector field into those parts having similar motion vectors. Each of the parts has a two dimensional motion and is denoted as a two dimensional translational patch which is describable with a set of two motion parameters as follows:

$$u(x,y) = a_1 \qquad \text{Eq. (1a)}$$

$$v(x,y) = a_2 \qquad \text{Eq. (1b)}$$

wherein $u(x,y)$ and $v(x,y)$ are the x-directional and the y-directional components of a motion vector located at a pixel position $(x,y)$ in the motion vector field, respectively, and $a_1$ and $a_2$ are real numbers. To segment the motion vector field into parts having similar motion vectors, there is used a similarity measure $M_i$ which is defined as follows:

$$M_i = |d_{x,R} - d_{x,i}| + |d_{y,R} - d_{y,i}| \qquad \text{Eq. (2)}$$

wherein $d_{x,R}$ and $d_{y,R}$ represent the mean values of the x-directional and the y-directional components of the motion vectors contained in a region R, respectively; and $d_{x,i}$ and $d_{y,i}$ are the x-directional and the y-directional components of a motion vector $d_i$ being inside or around the region R, respectively. If the similarity measure $M_i$ is less than a predetermined value, the motion vector $M_i$ belongs to the region R. After the first stage segmentation, the results, i.e., the two dimensional transitional patches shown in FIG. 3 are provided to a second segmentation block 106.

At the second segmentation block 106, the two dimensional translational patches are merged into divisions, each of which is consistent with a three dimensional rigid motion of a planar surface, and is called a planar patch. The three dimensional rigid motions are describable with six motion parameters as follows:

$$u(x,y) = a_1 + a_2 x + a_3 y \qquad \text{Eq. (3a)}$$

$$v(x,y) = b_1 + b_2 x + b_3 y \qquad \text{Eq. (3b)}$$

wherein $u(x,y)$ and $v(x,y)$ are the x-directional and the y-directional components of a motion vector located at a pixel position $(x,y)$, respectively, and $a_1$ to $a_3$ and $b_1$ to $b_3$ are real numbers.

Figure 4:
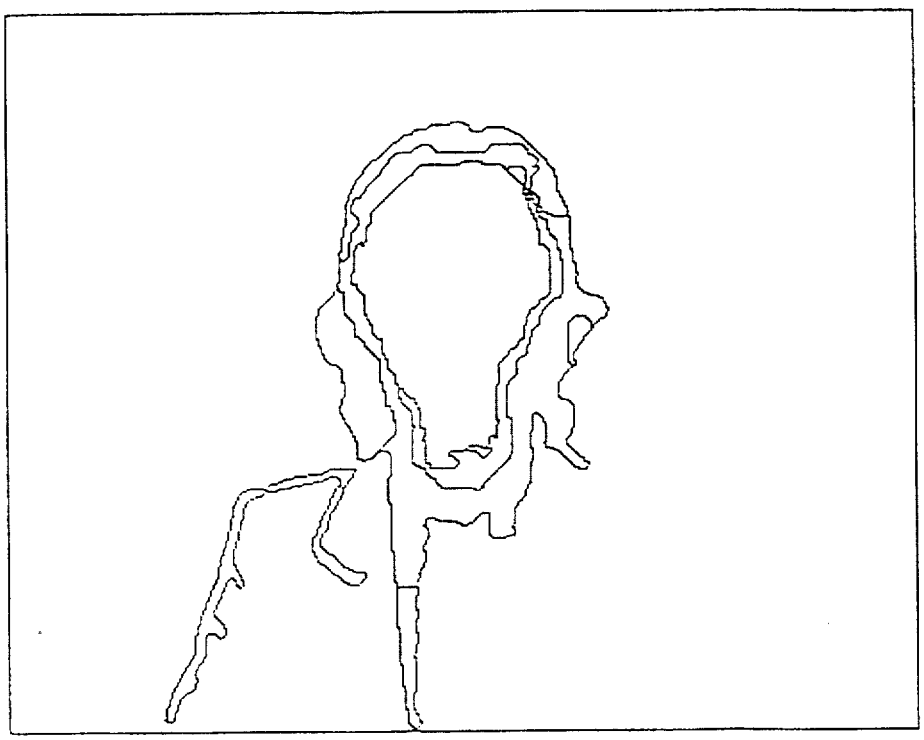

In order to merge the two dimensional translational patches into one planar patch, a region growing process is performed as follows. In a first step, a seed translational patch is selected among the two dimensional translational patches. A seed translational patch is the largest one $R_i$ out of the translational patches which are not yet assigned to any of already created planar patches. In a second step, the translational patches neighboring around the seed patch are determined as candidate patches $\{R_j : j=1, \ldots, n\}$ thereof. In a third step, whether to merge each of the candidate patches into the seed patch is tested. For example, an optimal set of six motion parameters for the combined patches $R_i \cup R_j$ is determined through Eq. (4):

$$E(a_1, \ldots, b_3) = \Sigma_k[(u(x_k, y_k) - a_1 - a_2 x_k - a_3 y_k)^2 + (v(x_k, y_k) - b_1 - b_2 x_k - b_3 y_k)^2] \qquad \text{Eq. (4)}$$

wherein k represents an element in the combined patches $R_i \cup R_j$, $u(x,y)$ and $v(x,y)$ are the x-directional and the y-directional components of a given motion vector located at a pixel position $(x,y)$, respectively. The optimal set of six motion parameters is a solution set for a set of six equations, each of which is derived by taking partial derivatives of Eq. (4) with respect to $a_1, \ldots, b_3$ and equating them to 0. Thereafter, an error value is determined between a given set of motion vectors in a candidate patch $R_j$ and an estimated set of motion vectors therein obtained from the optimal set of six motion parameters. And then, if the error value is less than a predetermined value, one of the candidate patches is merged into the seed patch. In a final step, the second and the third steps are repeated until the candidate patches cannot be found any more around the seed patch only or the combined seed and previously merged patches. After the second stage segmentation at the second segmentation block 106, the segmentation results, i.e., the planar patches shown in FIG. 4, are provided to a third segmentation block 108.

Figure 5:
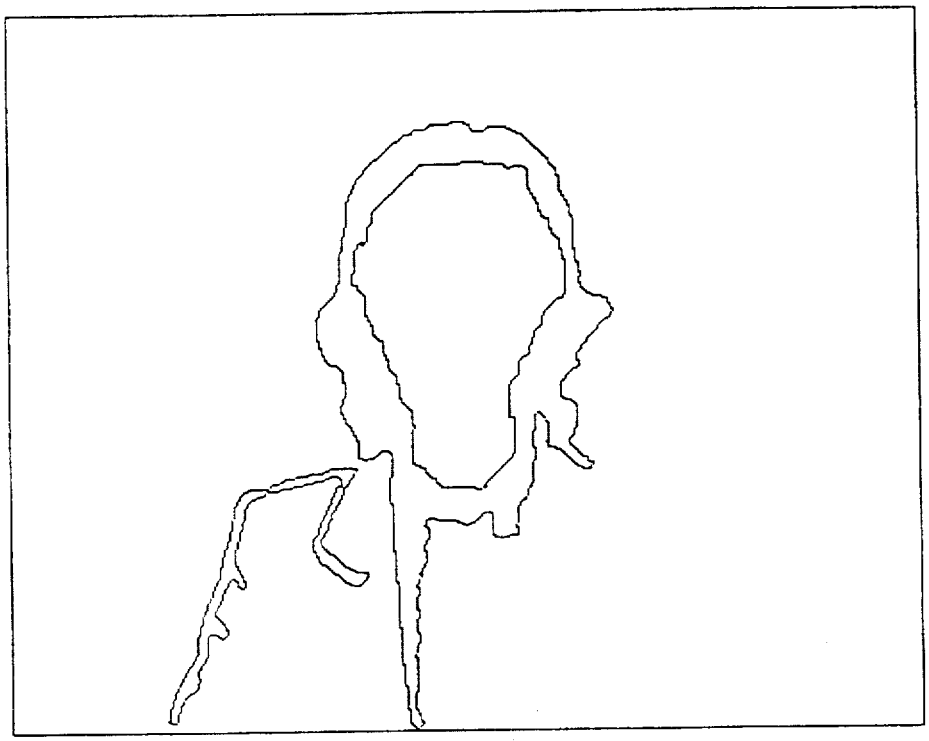

At the third segmentation block 108, the planar patches are merged into segments by using a parabolic patch model which is describable with a set of twelve motion parameters as follows:

$$u(x,y) = a_1 + a_2 x + a_3 y + a_4 x^2 + a_5 y^2 + a_6 xy \qquad \text{Eq. (5a)}$$

$$v(x,y) = b_1 + b_2 x + b_3 y + b_4 x^2 + b_5 y^2 + b_6 xy \qquad \text{Eq. (5b)}$$

wherein $u(x,y)$ and $v(x,y)$ are the x-directional and the y-directional components of a motion vector located at a pixel position $(x,y)$, respectively, and $a_1$ to $a_6$ and $b_1$ to $b_6$ are real numbers. The method of the third segmentation is identical to that of the second segmentation block 106, except that the planar patch motion model is replaced with the parabolic patch model. Hence, the motion vector field is compactly segmented to parabolic patches as shown in FIG. 5, and a set of twelve motion parameters corresponding to each of the parabolic patches is produced.

Figure 6:
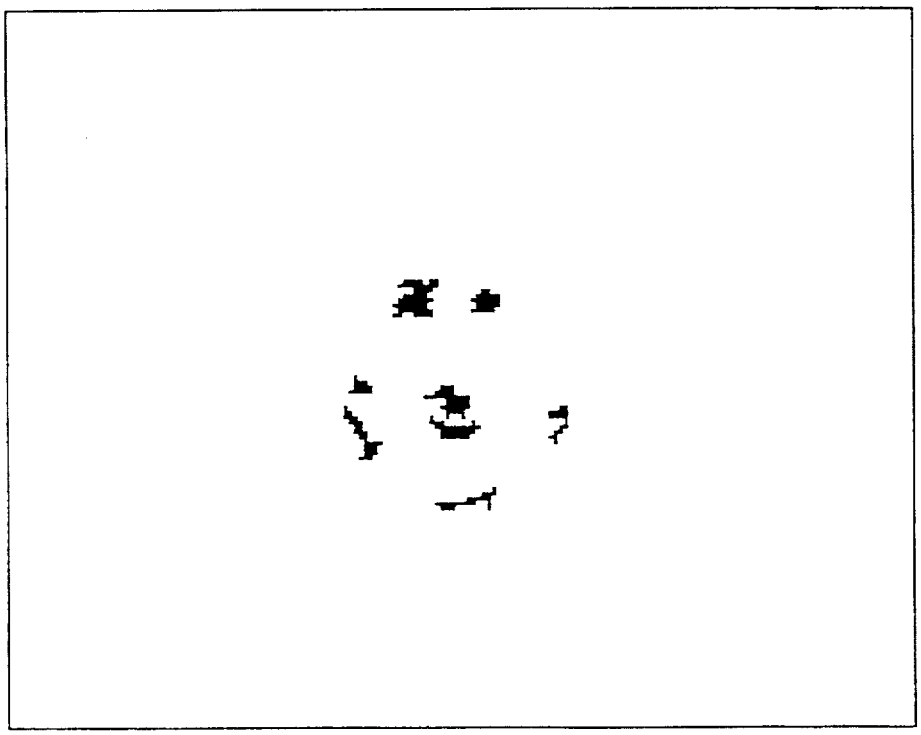

Additionally, after determining each set of twelve motion parameters corresponding to all of the parabolic patches in the current frame, the previous frame is compensated with each set of twelve motion parameters to provide a motion-compensated frame. And then, a motion fail region is extracted by subtracting the motion-compensated frame from the current frame. The motion fail region as shown in FIG. 6 needs an exceptional image encoding.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an object-oriented analysis-synthesis coder, for segmenting an image signal, said image signal containing moving objects therein, of a current frame into regions according to the moving objects therein and describing each motion of the moving objects with a set of motion parameters based on a hierarchy of motion models, which comprises the steps of:

(a) comparing the current frame with a preceding frame to detect a moving area in the current frame;

(b) further comparing the current frame with the preceding frame to detect a motion vector for each pixel in the moving area, to thereby produce a motion vector field;

(c) segmenting the motion vector field into translational patches, each of the translational patches having a two dimensional translation motion defined, using a set of two motion parameters, as:

$$u(x,y)=a_1$$

$$v(x,y)=a_2$$

and (d) merging the translational patches into planar patches, each of the planar patches being represented with a planar patch model described with a set of six motion parameters as:

$$u(x,y)=a_1+a_2x+a_3y$$

$$v(x,y)=b_1+b_2x+b_3y$$

and (e) grouping the planar patches into parabolic patches, each of the parabolic patches being represented with a parabolic patch model described with a set of twelve motion parameters as:

$$u(x,y)=a_1+a_2x+a_3y+a_4x^2+a_5y^2+a_6xy$$

$$v(x,y)=b_1+b_2x+b_3y+b_4x^2+b_5y^2+b_6xy$$

wherein u(x,y) and v(x,y) are an x-directional and a y-directional components of a motion vector located at a pixel position (x,y) in the motion vector field, respectively, and $a_1$ to $a_6$ and $b_1$ to $b_6$ are real numbers.

2. The method in accordance with claim 1, which further comprises the steps of:

(f) motion compensating the previous frame with each set of the twelve motion parameters to provide a motion-compensated frame;

(g) subtracting the motion compensated frame from the current frame to produce an error signal for each pixel; and (h) comparing the error signal with a predetermined value to extract a motion compensation fail region.

* * * * *

UNITED STATES PATENT AND TRADEMARK OFFICE

CERTIFICATE OF CORRECTION

PATENT NO.    : 5,734,737

DATED         : March 31, 1998

INVENTOR(S)   : Gyu-Hwan Chang, et al

It is certified that error appears in the above-identified patent and that said Letters Patent is hereby corrected as shown below:

Column 6, line 5, delete "ti" before "$u(x,y)=a_1+a_2x+a_3y$".

Signed and Sealed this

Sixteenth Day of June, 1998

BRUCE LEHMAN

*Attest:*

*Attesting Officer*    *Commissioner of Patents and Trademarks*